June 19, 1945.   M. MENCHACA   2,378,423
PINNING MACHINE
Filed Sept. 18, 1943   3 Sheets-Sheet 1
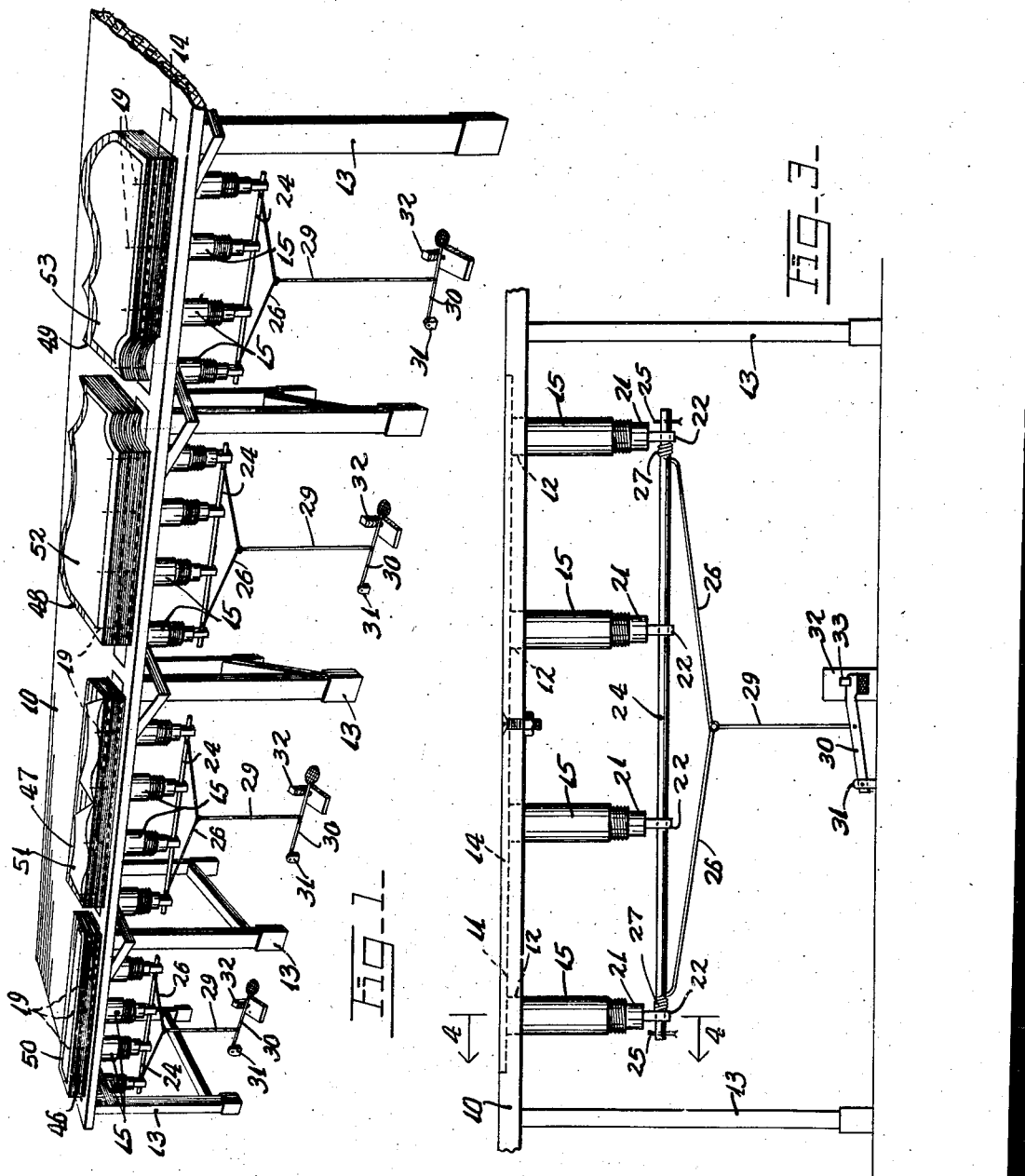
INVENTOR.
Manuel Menchaca
BY
ATTORNEY

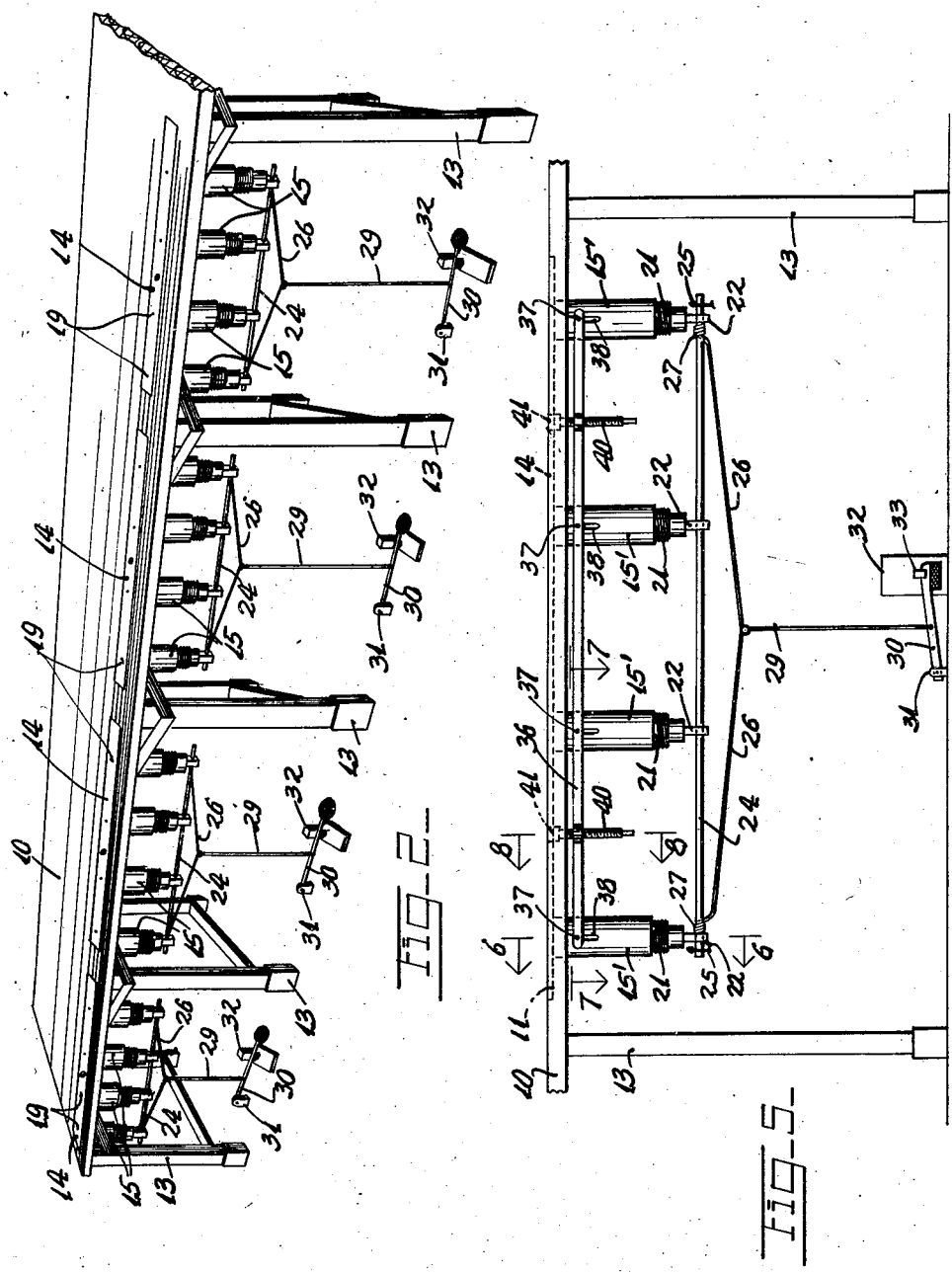

June 19, 1945.　　M. MENCHACA　　2,378,423
PINNING MACHINE
Filed Sept. 18, 1943　　3 Sheets-Sheet 3
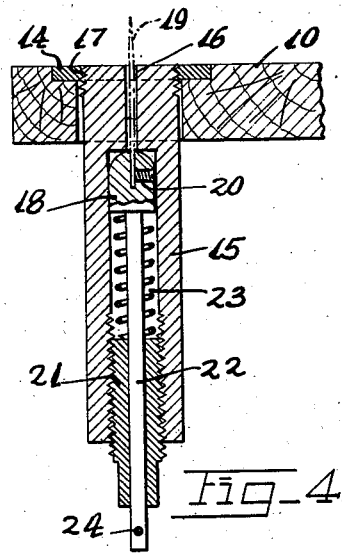
Fig_4_
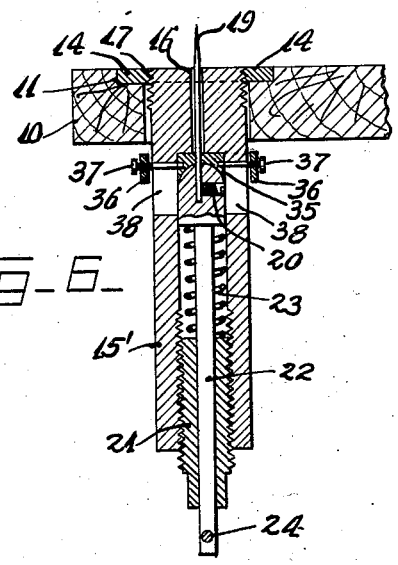
Fig_6_
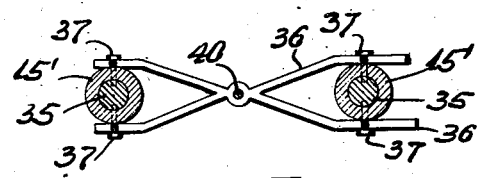
Fig_7_
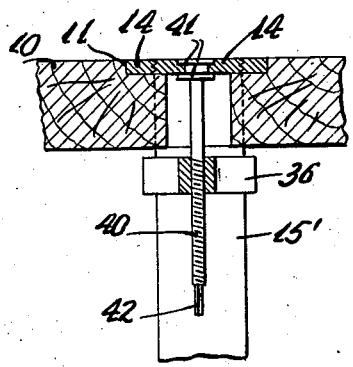
Fig_8_
INVENTOR.
Manuel Menchaca
BY
ATTORNEY Patented June 19, 1945

2,378,423

UNITED STATES PATENT OFFICE 2,378,423

PINNING MACHINE

Manuel Menchaca, Laredo, Tex.

Application September 18, 1943, Serial No. 503,009

10 Claims. (Cl. 164—78)

This invention relates to new and useful improvements in a pinning machine.

More particularly, the invention contemplates the construction of a pinning machine which will facilitate the cutting of laid up cloth goods for the manufacture of shirts, jackets, coats and other articles of clothing.

It is proposed to characterize the new pinning machine by the fact that it includes a flat top cloth cutting table from which a plurality of vertical pins project for holding layers of cloth prior to cutting, and a novel arrangement whereby the pins may be retracted beneath the surface of the table so that the layers may be cut with a conventional cloth cutting machine without interference by the pins.

The invention also contemplates a method for facilitating the matching of stripes, etc., in mass production of manufacturing clothing. Specifically, it is proposed to provide block patterns similar to regular patterns, except for the fact that they are slightly enlarged in one direction in the nature of a border.

The new method includes, when marking on striped, etc., materials, the picking out of all parts of the garment on which stripes, etc., are to be matched (right and left fronts, centers, collars, cuffs and pockets), and the making of new patterns of these parts allowing one inch more in width than the regular pattern, leaving exactly the same length but being careful that in this new enlarged "block pattern" the regular pattern can be adjusted completely from one edge to the other. Once all of these block patterns are available markings are made in the regular way, that is, accommodating all pieces of which a shirt or other garment is composed in the least possible yardage, taking good care that all portions (particularly the block patterns) are marked completely square to the strips of the material.

The application of the block patterns on the new pinning table will become clear as this specification proceeds.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a pinning machine with block patterns stacked on the table thereof, in accordance with this invention.

Fig. 2 is a perspective view similar to Fig. 1 but illustrated with the block patterns removed.

Fig. 3 is a fragmentary enlarged front elevational view of a section of the pinning machine, shown in Fig. 2.

Fig. 4 is a fragmentary enlarged sectional view taken on the line 4—4 of Fig. 3.

Fig. 5 is a front elevational view of a section of a pinning machine constructed in accordance with a modified form of this invention.

Fig. 6 is a fragmentary vertical sectional view taken on the line 6—6 of Fig. 5.

Fig. 7 is a fragmentary horizontal sectional view taken on the line 7—7 of Fig. 5.

Fig. 8 is a fragmentary enlarged vertical sectional view taken on the line 8—8 of Fig. 5.

The new pinning machine, in accordance with this invention, includes in combination a flat table top 10 having a plurality of sections each of which includes a recess 11 in the top thereof and several openings 12 from said recess extending to the bottom of the table thereof.

The table top 10 is supported in the usual way upon table legs 13. A metal strip 14 is set into each recess 11 and has its top face flush with the top face of the table 10 and completely fills up the compass of the recess. A plurality of vertical cylinders 15 are mounted on each strip 14 and extend downwards through the said openings 12 and have needle passages 16 extending upwards to the top face of the strip 14. These cylinders 15 have threaded top ends 17 which threadedly engage openings in the strip 14 for accomplishing the mounting of the cylinders upon the strip. A needle holding piston 18 is slidably mounted in each cylinder 15 and supports needles 19 which extend vertically upwards through the needle passages 16. Each needle holding piston 18 is provided with a set screw 20 which releasably clamps said needles.

A plug 21 is adjustably mounted in the bottom of each cylinder 15. A stem 22 connects with each piston 18 and slidably passes through each plug 21. Resilient means urge the pistons 18 upwards. This resilient means is in the nature of springs 23 coaxially mounted on the stems 22 and acting between the bottom faces of the pistons 18 and the top faces of the plugs 21.

A rod 24 connects the bottom ends of the stems 22 of each table section. More specifically, the stems 22 are formed with openings through which the rod 24 extends. Cotter pins 25 are mounted through the end portions of the rod 24 for holding it from coming out from the unit of stems 22.

Each rod 24 is associated with means by which it may be selectively moved downwards. This means includes a wire 26 having its ends 27 coiled around the end portions of the rod 24. The central portion of the wire 26 is provided with an eye opening loop 28 engaged by the hook end of a vertical wire 29 but has its other end hooked intermediate the end of a lever 30. Each lever 30 of the various units is pivotally mounted on a stud 31 mounted on the floor or other stationary part. Each lever 30 is cooperative with a bracket 32 which has a hook portion 33 under which the end of the lever 30 may be hooked.

With the parts as illustrated in Fig. 3 all of the needles of the illustrated unit are retracted. These needles may be projected above the table top 10 by pressing the lever 30 downwards with one's foot and shifting it slightly to disengage from the hook 33. This frees the lever 30 which may then move upwards. Now the rod 24 is no longer held downwards and the several springs 23 move the needle holding pistons 18 upwards projecting the pins 19.

In Figs. 5 to 8 a modified form of the invention is disclosed in which mechanism is provided for limiting the amount to which the pins will be projected above the top of the table. This means includes a collar 35 in each cylinder 15' and located above each piston 18 forming top stops for the pistons 18. A stud support frame 36 extends between the cylinders 15' of each unit of the table. Studs 37 are mounted on the stud support frame 36 and engage into vertical slots 38 formed in the side walls of the cylinder 15'. These studs 37 are connected with said collars 35.

The stud support frame 36 may be fixed in various vertical adjusted positions. This is accomplished by a pair of screws 40 threadedly engaging spaced portions on the stud support frame 36 and rotatively mounted upon the metal strip 14 (see particularly Fig. 8). Each screw 40 has a pair of spaced flanges 41 which engage the top and bottom faces of the metal strip 14 for accomplishing the rotative mounting of the screws 40. Each screw 40 is provided with a head 42 by which it may be manually turned. By turning the screws 40 it is possible to adjust the stud support frame 36 to various vertical positions and this will correspondingly move the collars 35 which in turn limit upward motion of the needle holding pistons 18.

In other respects this form of the invention is identical to the previous form and like parts are indicated by like reference numerals.

The operation of the new pinning machine may be carried out in the following manner:

Layers of cloth, such as the layers 46, 47, 48, 49, etc., are stacked on the cutting table by engaging edges thereof through the projecting pins 19. Block patterns 51, 52, 53, previously referred to, are then placed on the several piles of laid up material. From an examination of Fig. 1 it should be noted that the various sections of the cutting table may be used simultaneously. Now with a standard cloth cutting machine the laid up goods are cut out in the usual way, except for the fact that the projecting pins 19 of a particular table section are retracted by pressing downwards on the lever 30 of that section and hooking the lever beneath the hook 33. This indirectly retracts the needle holding pistons 18 and thus the pins 19.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In combination with a flat top table having a recess in the top face thereof and several openings from said recess to the bottom face of said table, a metal strip set into said recess and having its top face flush with the top face of said table, a plurality of vertical cylinders mounted on said strip and extending downwards through said openings and having needle passages extending to the top face of said strip, a needle holding piston slidably mounted in each of said cylinders for needles to extend through said needle passages, a plug adjustably mounted in the bottom of each cylinder, a stem connected with each piston and slidably extending through said plugs, resilient means for urging said pistons upwards, a rod connecting the bottom ends of said stems, and means for moving said rod downwards.

2. In combination with a flat top table having a recess in the top face thereof and several openings from said recess to the bottom face of said table, a metal strip set into said recess and having its top face flush with the top face of said table, a plurality of vertical cylinders mounted on said strip and extending downwards through said openings and having needle passages extending to the top face of said strip, a needle holding piston slidably mounted in each of said cylinders for needles to extend through said needle passages, a plug adjustably mounted in the bottom of each cylinder, a stem connected with each piston and slidably extending through said plugs, resilient means for urging said pistons upwards, a rod connecting the bottom ends of said stems, and means for moving said rod downwards, said vertical cylinders being threadedly engaged with said metal strip for accomplishing the mounting of the cylinders on the strip.

3. In combination with a flat top table having a recess in the top face thereof and several openings from said recess to the bottom face of said table, a metal strip set into said recess and having its top face flush with the top face of said table, a plurality of vertical cylinders mounted on said strip and extending downwards through said openings and having needle passages extending to the top face of said strip, a needle holding piston slidably mounted in each of said cylinders for needles to extend through said needle passages, a plug adjustably mounted in the bottom of each cylinder, a stem connected with each piston and slidably extending through said plugs, resilient means for urging said pistons upwards, a rod connecting the bottom ends of said stems, and means for moving said rod downwards, said needle holding pistons being provided with set screws for holding the needle.

4. In combination with a flat top table having a recess in the top face thereof and several openings from said recess to the bottom face of said table, a metal strip set into said recess and having its top face flush with the top face of said table, a plurality of vertical cylinders mounted on said strip and extending downwards through said openings and having needle passages extending to the top face of said strip, a needle holding piston slidably mounted in each of said cylinders for needles to extend through said needle passages, a plug adjustably mounted in the bottom of each cylinder, a stem connected with each piston and slidably extending through said plugs, resilient means for urging said pistons upwards, a rod connecting the bottom ends of said stems, and means for moving said rod downwards, said resilient means comprising springs coaxially on said stems and acting between said pistons and the top faces of said plugs.

5. In combination with a flat top table having a recess in the top face thereof and several openings from said recess to the bottom face of said table, a metal strip set into said recess and having its top face flush with the top face of said table, a plurality of vertical cylinders mounted on said strip and extending downwards through said openings and having needle passages extending to the top face of said strip, a needle holding piston slidably mounted in each of said cylinders for needles to extend through said needle passages, a plug adjustably mounted in the bottom of each cylinder, a stem connected with each piston and slidably extending through said plugs, resilient means for urging said pistons upwards, a rod connecting the bottom ends of said stems, and means for moving said rod downwards, said resilient means comprising springs coaxially on said stems and acting between said pistons and the top faces of said plugs, and said plugs being threadedly engaged in said cylinders for vertical adjustments thereof for controlling the tensions of said springs.

6. In combination with a flat top table having a recess in the top face thereof and several openings from said recess to the bottom face of said table, a metal strip set into said recess and having its top face flush with the top face of said table, a plurality of vertical cylinders mounted on said strip and extending downwards through said openings and having needle passages extending to the top face of said strip, a needle holding piston slidably mounted in each of said cylinders for needles to extend through said needle passages, a plug adjustably mounted in the bottom of each cylinder, a stem connected with each piston and slidably extending through said plugs, resilient means for urging said pistons upwards, a rod connecting the bottom ends of said stems, and means for moving said rod downwards, said rod being engaged through openings in the bottom ends of said stems, and cotter pins engaged through the ends of said rod for holding it from coming out.

7. In combination with a flat top table having a recess in the top face thereof and several openings from said recess to the bottom face of said table, a metal strip set into said recess and having its top face flush with the top face of said table, a plurality of vertical cylinders mounted on said strip and extending downwards through said openings and having needle passages extending to the top face of said strip, a needle holding piston slidably mounted in each of said cylinders for needles to extend through said needle passages, a plug adjustably mounted in the bottom of each cylinder, a stem connected with each piston and slidably extending through said plugs, resilient means for urging said pistons upwards, a rod connecting the bottom ends of said stems, and means for moving said rod downwards, comprising an eye connected between the ends of said rod and having a central loop portion, a wire link connecting with said loop portion, a lever connecting with said wire link, and means for holding said lever in a down position.

8. In combination with a flat top table having a recess in the top face thereof and several openings from said recess to the bottom face of said table, a metal strip set into said recess and having its top face flush with the top face of said table, a plurality of vertical cylinders mounted on said strip and extending downwards through said openings and having needle passages extending to the top face of said strip, a needle holding piston slidably mounted in each of said cylinders for needles to extend through said needle passages, a plug adjustably mounted in the bottom of each cylinder, a stem connected with each piston and slidably extending through said plugs, resilient means for urging said pistons upwards, a rod connecting the bottom ends of said stems, and means for moving said rod downwards, a collar in each cylinder and located above said pistons forming top stops for said pistons, a stud support frame extending between said cylinders, studs on said frame passing through slots in said cylinders and connected with said collars, and means for holding said frame in vertical adjusted positions.

9. In combination with a flat top table having a recess in the top face thereof and several openings from said recess to the bottom face of said table, a metal strip set into said recess and having its top face flush with the top face of said table, a plurality of vertical cylinders mounted on said strip and extending downwards through said openings and having needle passages extending to the top face of said strip, a needle holding piston slidably mounted in each of said cylinders for needles to extend through said needle passages, a plug adjustably mounted in the bottom of each cylinder, a stem connected with each piston and slidably extending through said plugs, resilient means for urging said pistons upwards, a rod connecting the bottom ends of said stems, and means for moving said rod downwards, a collar in each cylinder and located above said pistons forming top stops for said pistons, a stud support frame extending between said cylinders, studs on said frame passing through slots in said cylinders and connected with said collars, and means for holding said frame in vertical adjusted positions, comprising screws threadedly engaging said frame and rotatively mounted on said metal strip.

10. In combination with a flat table top, spaced needle holding members positioned beneath said table, means vertically slidably supporting said needle holding members in position beneath said table, needles mounted in the top of said needle holding members and projected upwards through said table top, springs urging said needle holding members into a position in which said needles will have their pointed ends projected beyond the top face of said table, and means for drawing said needle holding members downwards against the action of said springs for retracting said needles into an inoperative position beneath said table top.

MANUEL MENCHACA.